C. JILLSON.
Strawberry-Ripener.
No. 69,346. Patented Oct. 1, 1867.
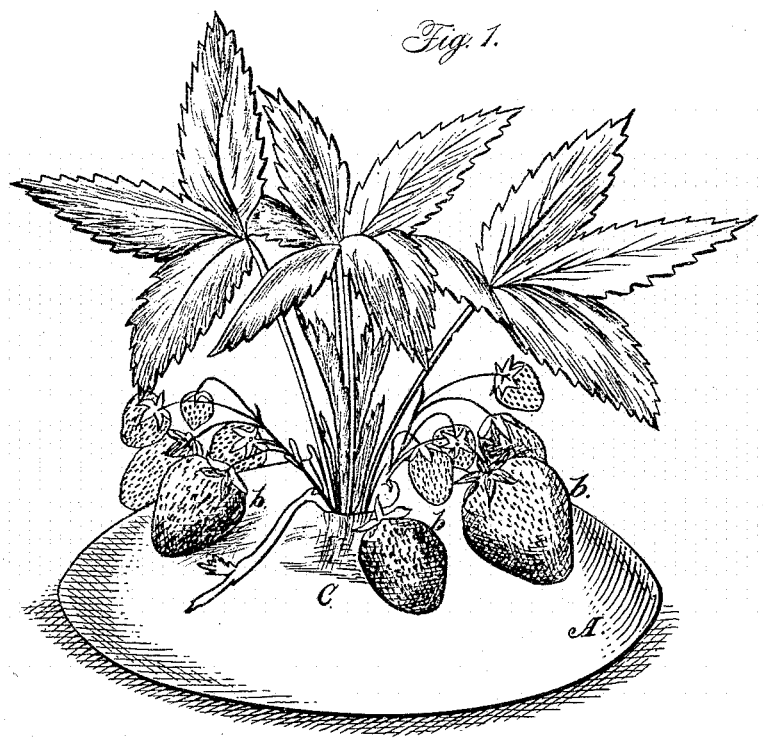
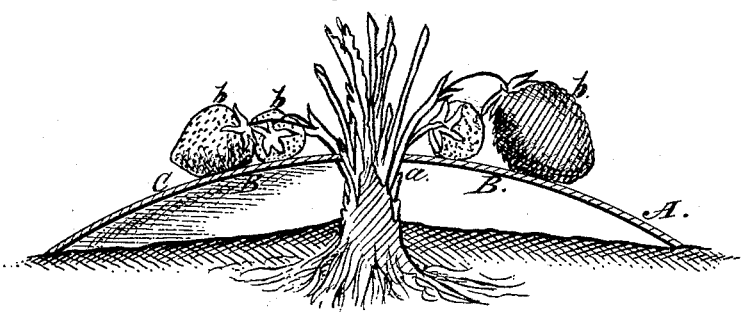
Witnesses:
Thos. H. Dodge
D. L. Miller
Inventor:
C. Jillson

United States Patent Office.

CLARK JILLSON, OF WORCESTER, MASSACHUSETTS.

*Letters Patent No. 69,346, dated October 1, 1867.*

IMPROVED STRAWBERRY-RIPENER.

*The Schedule referred to in these Letters Patent and making part of the same.*

KNOW ALL MEN BY THESE PRESENTS:

That I, CLARK JILLSON, of the city and county of Worcester, and Commonwealth of Massachusetts, have invented certain new and useful improvements in Strawberry-Ripeners, of which the following is a full, clear, and exact description, reference being had to the accompanying drawings, forming a part of this specification, in which—

Figure 1 represents a perspective view of one of my strawberry-ripeners as it appears when applied to use, and Figure 2 represents a cross-section of the same.

To enable those skilled in the art to which my invention belongs to make and use the same, I will proceed to describe it more in detail.

In the drawings the part marked A is my strawberry-ripener, and which is made in this instance of glass cut or formed in circular shape, and made concave upon the under side B. It has a hole, $a$, in the centre, through which the plant grows, and the fruit $b\ b\ b$ is supported upon the outer or convex part C. If preferred, several holes may be made in the same ripener for the passage of the plants. My ripener, in addition to supporting the fruit in a position to receive the full effects of the sun, also prevents the fruit from becoming embedded in the earth and thereby injured. Again, it prevents the runners from taking root immediately about the main stock, while at the same time it prevents the growth of weeds in the same position. When the ripener is made of glass and in the form shown, the rays of the sun are directed upon the earth about the roots of the plant, which is a very great aid in giving the plants an early and vigorous start in the spring. It will be seen that the fruit will always be clean and supported in a position to be easily gathered. The plants may be arranged so as to have the ripeners of one row fit in between those of another, and there may be two, three, or more rows between the paths or walks. The ripeners may be made of any desired material and form, although I prefer to make them of glass, and slightly concave upon their under sides. I have found them to be very useful, even when made of flat pieces of boards cut into the proper shape. The ripeners may be made, if preferred in any case, in two or more pieces, the line of separation being through hole $a$.

Having described and shown one mode in which my improvements may be applied to practical use, what I claim therein as new, and of my invention, and desire to secure by Letters Patent, is—

1. A strawberry-ripener made of glass, to be used substantially as and for the purpose set forth.

2. A strawberry-ripener, for supporting the fruit and preventing the runners taking root about the stem of the plant, substantially as set forth.

C. JILLSON.

Witnesses:
  THOS. H. DODGE,
  D. L. MILLER.